(12) United States Patent
Kluba

(10) Patent No.: US 11,737,591 B2
(45) Date of Patent: Aug. 29, 2023

(54) SHAPED BODY FOR SUPPORTING A HUMAN HEAD

(71) Applicant: KLUBA MEDICAL GMBH, Dusseldorf (DE)

(72) Inventor: Susanne Kluba, Moritzburg (DE)

(73) Assignee: KLUBA MEDICAL GMBH, Dusseldorf (DE)

( * ) Notice: Subject to any disclaimer, the term of this patent is extended or adjusted under 35 U.S.C. 154(b) by 0 days.

(21) Appl. No.: 17/251,470

(22) PCT Filed: Mar. 7, 2019

(86) PCT No.: PCT/EP2019/055745
§ 371 (c)(1),
(2) Date: Dec. 11, 2020

(87) PCT Pub. No.: WO2019/238281
PCT Pub. Date: Dec. 19, 2019

(65) Prior Publication Data
US 2021/0244210 A1 Aug. 12, 2021

(30) Foreign Application Priority Data
Jun. 13, 2018 (EP) .................................... 18177627

(51) Int. Cl.
*A47G 9/10* (2006.01)
*A47D 15/00* (2006.01)
(Continued)

(52) U.S. Cl.
CPC ................ *A47G 9/10* (2013.01); *A47C 7/383* (2013.01); *A47C 20/026* (2013.01);
(Continued)

(58) Field of Classification Search
CPC .. A47G 9/10; A47G 2009/1018; A47G 9/007; A47G 9/1081; A47G 9/109;
(Continued)

(56) References Cited

U.S. PATENT DOCUMENTS 4,617,691 A * 10/1986 Monti .................... A47C 7/383
5/636
6,042,184 A 3/2000 Kofoed
(Continued)

FOREIGN PATENT DOCUMENTS

CN 203969932 U 12/2014
DE 20 2008 006 818 U1 8/2008
(Continued)

OTHER PUBLICATIONS

International Search Report for PCT/EP2019/055745, dated Jun. 3, 2019 [PCT/ISA/210].
(Continued)

*Primary Examiner* — David R Hare
*Assistant Examiner* — Madison Emanski
(74) *Attorney, Agent, or Firm* — Sughrue Mion, PLLC

(57) ABSTRACT

The present disclosure relates to shaped body for receiving a skull on a support plane, wherein the shaped body is substantially ring-shaped, and wherein at least in one subregion, the contour of the cross section of the shaped body has a half ellipse inclined with respect to the support plane, and wherein at least in one subregion, the contour of the cross section of the shaped body is asymmetrical.

15 Claims, 8 Drawing Sheets

(51) Int. Cl.
  *A47G 9/00* (2006.01)
  *A61G 13/12* (2006.01)
  *A47C 20/02* (2006.01)
  *A61G 7/057* (2006.01)
  *A47C 7/38* (2006.01)
  *A61G 7/07* (2006.01)
  *A47D 13/08* (2006.01)

(52) U.S. Cl.
  CPC ........... *A47D 15/005* (2013.01); *A47G 9/007* (2013.01); *A47G 9/109* (2013.01); *A47G 9/1081* (2013.01); *A61G 7/05723* (2013.01); *A61G 13/121* (2013.01); *A47D 13/083* (2013.01); *A47G 2009/1018* (2013.01); *A61G 7/07* (2013.01); *A61G 7/072* (2013.01); *A61G 13/1215* (2013.01)

(58) Field of Classification Search
  CPC ...... A61G 5/121; A61G 5/12; A61G 13/1215; A61G 7/072; A61G 2200/14; A61G 13/121; A61G 7/05723; A61G 7/07; Y10T 428/24983; Y10T 428/24992; Y10T 428/00; A47D 15/005; A47D 15/008; A47D 15/005; A47D 13/083; C08G 2110/0041; B60N 2/2881; A47C 7/383; A47C 20/026
  See application file for complete search history.

(56) References Cited

U.S. PATENT DOCUMENTS

| | | | |
|---|---|---|---|
| 6,052,850 A * | 4/2000 | Salido | A47G 9/10 5/655 |
| 6,266,832 B1 | 7/2001 | Ezell | |
| 2003/0196269 A1* | 10/2003 | Britto | A47D 13/083 5/636 |
| 2007/0283495 A1* | 12/2007 | Ghani | A47G 9/10 5/636 |
| 2010/0242180 A1* | 9/2010 | Warnock | A61G 7/072 5/637 |
| 2012/0073058 A1 | 3/2012 | Sclare et al. | |
| 2014/0352069 A1* | 12/2014 | Verde Sanchez | A47G 9/10 5/636 |

FOREIGN PATENT DOCUMENTS

| | | | | |
|---|---|---|---|---|
| DE | 10 2009 037 159 A1 | | 2/2011 | |
| FR | 2 837 437 A1 | | 9/2003 | |
| FR | 2 859 615 A1 | | 3/2005 | |
| KR | 200474341 | * | 7/2014 | ............ A47G 9/109 |
| KR | 20170053672 | * | 5/2017 | ............ A47D 13/083 |

OTHER PUBLICATIONS

Written Opinion for PCT/EP2019/055745, dated Jun. 3, 2019 [PCT/ISA/237].

* cited by examiner

SHAPED BODY FOR SUPPORTING A HUMAN HEAD

CROSS REFERENCE TO RELATED APPLICATIONS

This application is a National Stage of International Application No. PCT/EP2019/055745, filed Mar. 7, 2019, claiming priority based on European Patent Application No. 18177627.9, filed Jun. 13, 2018.

The present invention relates to a shaped body for supporting a human head, in particular the head of an infant. The invention further relates to a method for the treatment of positional deformations of the skull, particularly in infants.

Two common forms of cranial deformity are plagiocephaly and brachycephaly. These are wide-spread phenomena seen especially in infants (babies) and toddlers. They may even occur in adulthood, albeit more rarely. Mixed forms may also often occur.

Plagiocephaly (often also referred to as "skew skull") is when the shape of the head is asymmetrical and skew. Depending on the severity, however, the ears may also be skew and the face asymmetrical or the back of the head flat.

Brachycephaly (also called "flat head") is the name for a short skull in which the ratio of the length of the head to the width of the head is abnormal. The head is flattened on both sides at the occiput. With this form too, the back of the head may slope upwards if the deformity is severe.

Skull deformities can have different causes and different degrees of severity. Positional skull deformities are by far the most commonly observed.

Deformities may already occur in the womb, e.g. as a result of a prolonged and confined position in the small pelvis. Multiple pregnancies (e.g. twins) are also a risk factor for the development of cranial deformities, due to the limited space within the womb. Difficult childbirth, e.g. by suction cup or forceps, may also promote a deformity of the skull.

Even after birth, and with the head initially a normal shape, there may be a risk of a skull deformity developing, since infants are still not very mobile in the first weeks and months of life and are often lying down for long periods. This risk is exacerbated by the medical recommendation that infants should lie on their backs. This is recommended by doctors and midwives as an important measure in avoiding sudden infant death, especially because newborn babies cannot move, or can move only with great difficulty, from the supine position to the potentially dangerous prone position. If the infant's head rests predominantly on the same spot, the latter has to withstand increased pressure time and time again. Since the skull bone is still soft and sensitive in the first months of life, this pressure can easily cause it to lose its natural rounded shape.

Many infants also prefer a certain viewing direction and therefore often adopt a preferred head position. They always fall back into this position even while sleeping or when lying on their back. This effect increases if there is already a flattening or asymmetry of the skull. In the first few weeks of life, it is difficult for the child to avoid adopting this position independently. Only with increased physical and muscular strengthening and mobility does the risk of a prolonged and constant lying position decrease and with it also the risk of skull deformities.

In addition, muscle tension or muscle contractions and blockades can promote sleeping and lying on one side and lead to deformation of the child's head.

All of these factors can lead to a more or less severe asymmetrical or symmetrical head deformity, which may also affect other regions such as the face or ears. A flattened back of the head or a lateral flattening can be observed particularly often. Therapeutic measures include head support, physiotherapy, osteopathy or, in pronounced cases, helmet therapy.

Although much less common, premature cranial sutures may also cause head deformities. In these cases, one or more cranial sutures (which are actually still open in neonates) are ossified too early. The normal growth pressure from the brain cannot then lead to a uniform growth of the skull in all directions, and instead the head spreads more in the unclosed directions in order to compensate. This in turn also causes head deformation. Depending on the severity, surgical treatment may be possible.

In adults, especially in cases of prolonged confinement to bed or with disabilities or diseases that make it difficult to control body posture or head posture, there may be a need to support the head in a defined position or to control the support of the head from the outside. The targeted support of the head can also be used to assist in other medical measures, e.g. the stabilization of the head position during artificial ventilation of a patient.

In addition, supporting the head can also allow the subject to lie more comfortably and can therefore be advantageous. Supporting the head can also serve to relieve strain on the head. For example, pressure points on the head and/or tension in the head/neck region can be reduced or entirely avoided.

In the prior art, pillows for supporting the head are known which have a depression closed off from below (bottom side) by an elastic membrane. The back of the head is supported in this depression so that it rests on the elastic membrane. In this device, however, the head is not supported and stabilized sufficiently securely, because there is a risk of the head slipping out of the depression during a movement.

DE 20 2008 006 818 U1 discloses a head shell which is rounded symmetrically on the outside and inside. This head shell has a constant thickness and is adapted on the inside to the curvature of the back of the head. However, this device is too rigid and cannot yield sufficiently flexibly to the locally increased pressure caused by the head that is resting on it.

FR 2 859 615 A1 discloses an infant pillow which has a closed, circular recess for supporting a head. The diameter of the circular recess is fixed and allows only slight freedom of movement of the head.

DE 10 2009 037 159 (A1) likewise discloses a supporting ring especially for the head of an infant. This has a ring-shaped main body. The cross section of the main body is substantially circular in the unloaded state. The pressure distribution is not optimal when the head is resting on it.

The object of the present invention is therefore to make available a shaped body which permits improved support of the head, in particular the head of an infant. In particular, a supported position is to be made possible that is sufficiently stable and secure and that is pleasant and comfortable for the user. This is intended to reduce as far as possible the risk of positional deformation of the skull. Specifically in the case of infants, the object is also to counteract prenatal or natal deformities of the skull.

According to the invention, this object is achieved by the provision of a shaped body according to claim 1. Advantageous developments are the subject matter of corresponding subclaims. The object is also achieved by the independent use claim for supporting a skull, in particular for the prevention and/or for the treatment of positional deformations of the skull, in particular the skull of infants.

The shaped body according to the invention has a substantially ring-shaped, preferably open shaped body, wherein in a first variant, at least in one subregion, the contour of the cross section of the shaped body comprises an inclined half ellipse. The inclination of the ellipse is relative to a (notional) support plane on which the shaped body lies substantially flat. In a second variant for the shaped body according to the invention, the contour in at least one subregion of the cross section of the shaped body is asymmetrical and has a convex support surface.

One embodiment comprises one of the two variants. In a preferred embodiment, both variants are included.

The support surface designates that surface of the shaped body that faces substantially inwards, i.e. in the direction of the centre of the shaped body, or is inclined with respect thereto and on which the head rests. The support surface is generally adapted to the shape of the head.

The core of the invention according to both variants is that, by virtue of the flat inclination of the support surface of the shaped body, the effective area of the shaped body on which the head rests increases considerably, specifically with increasing pressure, and the pressure forces thus acting on the head are better distributed with comfortable freedom of movement.

According to the invention, in the first variant, part of the cross section or part of the contour of the cross section has the shape of an ellipse, in particular a half ellipse. The region of the headrest that comes into contact with the head (support surface) is preferably the region that has the shape of an ellipse. In particular, the support surface is flattened and/or rounded in such a way that the outer contour of the cross-sectional area has the shape of a half ellipse. One of the semi-axes, preferably the semi-major axis, preferably runs substantially parallel to a tangent which lies at the location where the head touches the support surface. For this purpose, the ellipse is in particular tilted or inclined with respect to a plane which runs substantially parallel to the support plane on which the shaped body lies substantially flat.

According to the second variant according to the invention, the contour of the cross section of the shaped body is asymmetrical and thus in particular has no axis symmetry or mirror axis. Furthermore, according to the second variant according to the invention, the contour of the cross section of the shaped body has a substantially convex support surface, i.e. an outwardly curved support surface. This ensures in particular that there is sufficient freedom of movement, particularly in regions with low pressure.

With the shaped body according to the invention, the head can be supported with the greatest possible pressure relief, while at the same time allowing great freedom of movement, such that the risk of a pressure point and/or deformation of the resting skull part due to an unwanted and uncontrolled pressure load from the base surface on which the shaped body lies is reduced. This applies both to infants and to adult patients.

Furthermore, the special geometry of the shaped body according to the invention automatically results in a centring effect with regard to the position of the head when the latter is supported. This is not only due to the substantially ring-shaped basic structure of the shaped body, but also due to the inclination of the support surface for the head, which inclination is present in both variants of the invention. On account of this inclination, the head slips almost automatically in the direction of the centre point of the ring-shaped body. This is advantageous in particular with an oblique base surface.

Advantageously, the open ring shape of the shaped body permits an individual adaptation to the shape and size of the user's head by virtue of the free ends of the ring. This can be used either to achieve the most uniform possible pressure load on all regions of the skull or, especially in the case of treatment of skull deformities, to achieve targeted pressure loading and pressure relief at certain regions of the skull.

A "shaped body" is understood to mean a body which can largely maintain or regain its shape by low mechanical forces being exerted. The shaped body is preferably elastic.

The "cross section" of a shaped body is understood to mean a section through a longitudinal axis of the shaped body, which section runs in a plane perpendicular to the substantial longitudinal extent of the shaped body. The cross section of a substantially ring-shaped shaped body is understood to mean a section through the shaped body that runs in a plane radially with respect to its centre of symmetry and perpendicular to the plane of rotation.

The "contour" of a cross section is understood in particular to mean the outer line of the cross section or of the cross-sectional area that surrounds or comprises the cross-sectional area.

"Ring-shaped" or a "ring shape" is understood to mean a basic structure that has a centre point and that is circular at least in sections. A ring-shaped form can preferably be obtained by rotating a closed surface about a point outside the closed surface (rotation body).

The term "substantially ring-shaped" in the sense of the invention relates to a ring with a varying radius of rotation. The radius of rotation can, for example, vary in such a way that the ring or the opened ring forms an oval.

In a preferred embodiment, the shaped body is open and has a first end and a second end. In particular, the average diameter of the cross section of the shaped body decreases towards the ends. It is thereby possible in particular to avoid edges or regions with a relatively small radius of curvature which can reduce the comfort of the shaped body.

In a preferred embodiment, the shaped body has the form of a torus, in particular the form of an open torus. A torus is also called a tyre or doughnut. It is particularly preferable according to the invention that the shaped body has the geometry of an open torus with tapering cross sections (cyclide) at its open ends. The tapering ends preferably form the engagement for the neck when the head is supported. In this preferred embodiment, the neck can then lie substantially flat with respect to the support plane.

A "base surface" designates the surface on which the shaped body according to the invention is mounted or rests. As a general rule, it is substantially flat and therefore forms a plane under the shaped body. The base surface is a mattress, for example, or the head support surface of a baby seat, of a car seat for children, of a pram, of a bicycle seat for children or of a bicycle trailer. The "support plane" is understood to mean the notional "base surface" on which the shaped body can lie.

"Inclination" means in particular the average gradient (in particular the averaged secant gradient) relative to the notional support plane on which the shaped body according to the invention can be placed. However, other reference planes or reference lines are also conceivable. The averaging for determining the average gradient is preferably carried out over a substantial region of the outer line of the corresponding portion of the cross section.

An "ellipse" designates a closed oval curve. The ellipse can be defined by specifying its semi-major axis and its semi-minor axis. The semi-major axis designates half the diameter at the widest point; the semi-minor axis designates half the diameter at the narrowest point of the ellipse. According to the invention, the ratio of the length of the semi-major axis to the length of the semi-minor axis is preferably not more than 1 to 10, particularly preferably not more than 1 to 8, very particularly preferably not more than 1 to 5 and especially not more than 1 to 3.

In a preferred embodiment of the shaped body, at least in one subregion, the included angle between the support plane and the averaged tangent on an outwardly facing part of the cross section of the shaped body is greater than the included angle between the support plane and an averaged tangent on an inwardly facing part of the cross section of the shaped body.

An averaged tangent preferably designates an averaged gradient over a region of the cross section. The averaging can be arithmetic, but also quadratic. Furthermore, the averaged tangent can be approximated by means of a line of best fit over the considered region of the cross section.

An "outwardly facing part of the cross section" signifies that part of the contour (also: outer line) of the cross section that has an outward inclination, i.e. away from the centre of the ring. Accordingly, an "inwardly facing part of the cross section" signifies that part of the contour of the cross section that has an inward inclination, i.e. towards the centre of the ring.

In a preferred embodiment, the semi-major axis of the half ellipse is inclined by up to 90° with respect to the notional support plane, preferably by 25° to 50°.

In a likewise preferred embodiment, the included angle between the support plane and an averaged tangent on the outwardly facing part of the cross section is preferably less than or equal to 180°, preferably 65° to 90°, more preferably 70° to 80°. The included angle is preferably less than or equal to 60°, preferably less than or equal to 50°, preferably 30° to 42°, more preferably 35° to 40° on the inwardly facing part of the cross section.

The shaped body preferably has at least in part an indentation hardness of 8 N to 11 N, preferably of 9.5 N. The depth of indentation is preferably at least in part 25% to 55%, preferably 40%. The indentation hardness and the depth of indentation can be influenced in particular by the type of material.

The shaped body can be designed as a hollow body or as a solid body. Combinations of hollow body and solid body are also possible. A shaped body is preferred which is formed entirely as a solid body.

The material of the shaped body, in particular of the solid body, is preferably selected from the group consisting of synthetic polymers (thermosets, thermoplastics or elastomers), e.g. silicones, polyamides, polyesters, acrylates, polyurethanes, natural polymers. e.g. rubber, cork and celluloses, or semi-synthetic polymers, e.g. cellulose derivatives or mixtures thereof. Silicones and polyurethanes (PU) are particularly preferred. Polyurethanes can preferably be used in the form of PU foams. Silicones are particularly preferred.

In a particularly preferred embodiment, the polyurethane foam has one or more (preferably all) of the following properties:
- a closed surface and/or
- a bulk density of the foam of 40 to 1200 kg/m$^3$, preferably of 150 to 1200 kg/m$^3$, particularly preferably of 150 to 300 kg/m$^3$, more preferably of 230 kg/m$^3$, according to DIN EN ISO 845, and/or
- a density of the skin of 500 to 900 kg/m$^3$, preferably of 600 to 800 kg/m$^3$, particularly preferably of 700 kg/m$^3$, according to DIN 53 479, and/or
- a tensile strength of the skin of 600 to 800 KPa, preferably of 724 KPa, according to DIN 53 504, and/or a tensile strength of the foam of 150 to 250 KPa, preferably of 206 KPa, according to DIN EN ISO 1798, and/or
- an elongation of the skin of 150 to 250%, preferably of 195%, according to DIN 52 504, and/or an elongation of the foam of 110 to 180%, preferably of 139%, according to DIN EN ISO 1798, and/or
- a tear propagation resistance of the skin of 2 to 4 N/mm, preferably of 3.1 N/mm, and/or a tear propagation resistance of the foam of 0.5 to 1.5 N/mm, preferably of 0.9 N/mm according to DIN ISO 34-1.

In a preferred embodiment, the shaped body is produced from polyurethane foam particles and/or polyurethane foam flakes.

In an alternative preferred embodiment, the silicone has one or more (preferably all) of the following properties:
- a Shore hardness on the silicone of approximately 45 Shore 00 to approximately 90 Shore A, preferably of approximately 55 Shore 00 to approximately 50 Shore A, very particularly preferably of approximately 70 Shore 00, according to DIN 53505, and/or
- a tear strength of the silicone of approximately 1 to approximately 8 N/mm$^2$, preferably of approximately 2 to approximately 6 N/mm$^2$, very particularly preferably of approximately 2 N/mm$^2$ according to DIN 53504 (specimen S3A), and/or
- an elongation of the silicone of approximately 400 to approximately 900%, preferably of approximately 500 to approximately 700%, very particularly preferably of approximately 600% according to DIN 53504 (specimen S3A), and/or
- a tear propagation resistance of the silicone of approximately 1.2 to approximately 16.5 N/mm, preferably of approximately 3 to approximately 12 N/mm, very particularly preferably of approximately 5 N/mm according to DIN 53515.

The silicone is particularly preferably biocompatible and sterilizable.

The silicone can preferably be a mixture of different silicones. The following manufacturers of silicones are mentioned as examples: BLUESTAR SILICONES, WACKER SILICONES, Elkem Silicones, ACC Silicones. However, silicones from other manufacturers are also possible. A person skilled in the art is familiar with how silicones can be produced and mixed in order to obtain a shaped body for receiving a skull on a support plane.

The silicone is preferably powdered with talcum or fluorinated, preferably fluorinated, i.e. coated with fluorine. Fluorine atoms are thus incorporated into the surface of the silicone. This has the advantage that a smoother or less tacky surface is produced.

In an alternative preferred embodiment, the material of the shaped body is a thermoplastic. This thermoplastic preferably has a hardness of 50 VLRH (DIN ISO 27588 (D=6 mm)) to 50 Shore A (DIN ISO 7619). This thermoplastic is easy to process.

If the shaped body is wholly or partially designed as a hollow body, it consists of a "shell" which can be formed from the materials mentioned above for the solid body or from mixtures thereof. The shell can be elastic. The thickness of the shell depends on the material and is variable. The shell is preferably so thick that the shaped body has sufficient stability to support the head. The hollow body can contain a filling. The latter can likewise be formed from the materials mentioned above for the solid body or from mixtures thereof. The filling can be liquid, solid or gel-like. A filling of flakes or particles is preferred. A reduction in the total weight and an improvement in the adaptability of the shaped body to the resting head can thus be achieved.

Preferred materials for the filling are selected from the group consisting of natural materials such as plant fibres (e.g. cotton), animal fibres (e.g. sheep's wool), feathers (e.g. down), plant seeds or kernels (e.g. spelt husks or cherry stones) or mixtures thereof.

In order to improve the hygiene or the longevity of the shaped body according to the invention, additives can be added to the material for the shaped body and/or the filling, for example a UV protection additive and/or an antibacterial agent. In a preferred embodiment, a UV protection additive and/or an antibacterial agent can be contained in the polyurethane foam and/or in the silicone.

In a preferred embodiment, the material for the shaped body and/or the filling is essentially bio-based and/or biodegradable. The polyurethane foam or the silicone is preferably biodegradable or at least designed in such a way that the material can be decomposed more quickly than is normally the case.

The material of the solid body or of the shell of the hollow body can preferably be disinfected by wiping. This serves to improve hygiene. In particular, the material of the solid body or of the shell of the hollow body has a closed surface. This is preferably characterized in that the material can absorb little liquid, preferably no liquid.

In a particularly preferred embodiment, the shaped body has a covering (cover) which completely or partially surrounds it. The cover of the shaped body can be formed from all commercially available materials. Textile materials made from plant or animal fibres, preferably fabrics, particularly preferably cotton, are preferred. However, other natural or non-natural materials are also possible, e.g. leather. Possible synthetic materials are, for example, polyamides or polyesters or mixtures thereof. Natural materials that have been organically grown are particularly preferred.

Depending on the material, the cover can be used one or more times. This depends on the durability and washability and wipeability of the material. If the cover is made of cotton, for example, it is preferably washable and can be used several times.

In a preferred embodiment, the material of the cover contains an additive, e.g. a UV protection additive and/or an antibacterial agent to improve the hygiene or longevity of the cover.

In a preferred embodiment, the cover lies on the shaped body and does not completely surround it, i.e. the cover only partially surrounds the shaped body. To avoid slipping, the cover is preferably embossed, for example by thermoforming. In this embodiment, the cover is substantially round, for example, but has an embossing in the region where the head rests on the shaped body, in the sense that the shape of the cover is adapted to the shape of the shaped body. In this embodiment, the cover is located between skull and shaped body during use.

In an alternative preferred embodiment, the cover completely surrounds the shaped body and can be detached from the shaped body and reapplied, for example by means of a zipper or one or more press studs. A zipper is preferred. In this way, the cover can be washed separately from the shaped body, which likewise improves hygiene. The zipper can be partially recessed, i.e. the zipper can be at least partially accommodated or inserted in a small pocket of the cover. Hard edges of the zipper can be effectively avoided in this way. It is also conceivable that the zipper is a concealed zipper, which is covered by one or more textile or plastic strips over at least part of the length of the zipper.

The cover can exactly fit the shaped body. However, it is particularly preferable that the cover is not an exact fit, i.e. has regions that are not taken up by the shaped body during the regular use of the shaped body. These regions are also referred to below as "cutouts".

The cutouts preferably continue in the regions of the cover surrounding the open ends of the shaped body. It is particularly preferable that the cutouts are designed such that the open ends of the shaped body are thereby bridged in their outward appearance and a substantially closed ring thus results. By way of the cutouts, a region of the shaped body can be made available which is particularly flat and in particular can provide freedom for the neck, which further improves the comfort and the load distribution.

The cover preferably has a first end and a second end. The ends of the cover, preferably the cutouts of the cover, preferably have mutually detachable means. In the case of the cutouts at the open ends of the shaped body, the means can in particular be designed in such a way that, with their aid, the open ends of the shaped body are brought into engagement with or connected to each other in a holding manner. In this embodiment, the cutouts with their detachable means therefore lead to a functional ring closure.

However, the detachable means can also be attached to the shaped body (and not to the cover). This is provided in particular when the shaped body is open and has a first end and a second end and is designed without a cover. The ends of the shaped body then each have detachable means for connecting the ends.

The detachable means (on the cover or on the shaped body) are preferably selected from the group comprising: Velcro fastener, button/buttonhole, press stud/press stud receiver, hook/eye or cords. A Velcro fastener is particularly preferred. The latter can be designed with a Velcro strip or Velcro pad. The configuration with at least one Velcro pad is particularly preferred.

The detachable means are preferably designed in such a way that the shaped body can adopt variably different sizes (diameters) in the closed form. This permits adaptation to different head sizes.

Particularly preferably, the material of the cover is at least partially or completely of Velcro. In one embodiment, the cover has the Velcro material only at the cutouts. If the cover has a Velcro material, in this embodiment the Velcro material forms the functional counterpart to the Velcro strip or Velcro pad. The Velcro material has the advantage, over the usual counterpart (to a Velcro pad or Velcro strip), that it is softer and more pleasant on the skin.

Materials or textiles which have a coarse interweaving and which have, as structural property, a weight of in particular 190 (±20%) $g/m^2$ in accordance with UNE 40600-6 are preferred as Velcro material.

The detachable means arranged on the shaped body or on a cutout on the cover can likewise interact with a base surface. In this case, the base surface or a cover of the base surface must at least partially be designed such that it has the functional counterpart to the detachable means arranged on the recess or on the cover or on the shaped body. In this case, the mutually detachable means can also be designated as fastening means. In particular, the shaped body or the cover can have a first fastening means for fastening the shaped body or the cover to the base surface, and the base surface or a cover of the base surface can have a second fastening means, the first and the second fastening means being connectable. The detachable means mentioned above are preferably suitable as fastening means, although other fastening means are also conceivable.

In one embodiment, provision is made that the shaped body or the cutouts on the cover (or the cover itself) have mutually detachable means for connecting the open ends and additionally have a first fastening means, which serves to fasten the shaped body or the cover to the base surface. In this way, the open ends can be connected, and the shaped body can be fastened to a base surface.

The base surface is preferably a mattress, the head support surface of a baby seat, of a car seat for children, of a pram, of a bicycle seat for children or of a bicycle trailer. By fastening the shaped body or the cover of the shaped body to the base surface, the shaped body can be fixed and slipping of the shaped body on the base surface can be prevented. This is particularly advantageous when the base surface is inclined or vertical, for example in the case of the head support surface of a baby seat, of a car seat for children or of a bicycle seat for children.

The invention also comprises the combination of the shaped body according to the invention with a first fastening means (the first fastening means can be attached to the shaped body or to the cover of the shaped body) and a second fastening means for fastening the shaped body to a base surface, the first and the second fastening means being connectable. The second fastening means is preferably fastened to the base surface or to a cover of the base surface.

In a further embodiment, the shaped body has one or more stiffening elements. These can serve in particular to adjust the size of the preferably open ring. The size of the ring desired by opening or closing the ring can thus be set. However, they can also serve to solidify the shaped body.

Preferably, the stiffening element is at least partially surrounded, preferably completely surrounded, by the shaped body. In the case of a solid body, the stiffening element can preferably be introduced there already during the production of the solid body. For example, in the embodiment with a solid body made of silicone, it can be melted into the silicone. This is a particularly preferred embodiment. In the case of the hollow body with a filling, the stiffening element is preferably completely surrounded by the filling. However, an arrangement of the stiffening element on the outer surface of the shaped body would also be conceivable, e.g. between the shaped body and the cover of the shaped body.

The stiffening element is preferably composed of two members. However, it is also conceivable for the stiffening element to be composed of one member or of more than two members, for example of three or more members. The members can be connected movably to one another (e.g. by hinges). It is advantageous if the position of the members relative to one another is designed to be lockable in a stepless manner and/or in steps.

The preferred material for the stiffening element is harder (i.e. it has a higher strength) than that of the shaped body or of the filling of the hollow body. A material substantially similar to that of the shaped body would also be conceivable, but one which achieves a different stiffness through additives and/or a different treatment. Preferred materials for the stiffening element include in particular plastic, carbon fibre, glass fibre and metal, in particular stainless steel or aluminium.

In a preferred embodiment, the shaped body has a stiffening element and no cover. A shaped body can thus be made available which is adjustable in size and which is less expensive and more hygienic than a shaped body with cover. Improved hygiene is advantageous in particular for hospitals, for example in the operating theatre.

In another preferred embodiment, the shaped body has a stiffening element and also a cover which rests on the shaped body and does not completely surround it. To avoid slipping, the cover is preferably embossed, for example by thermoforming. For the hospital sector, it is preferable that the cover is used only once. However, a reusable cover can also be used.

In one aspect of the invention, the shaped body according to the invention and/or the combination according to the invention serves to prevent and/or treat positional deformations of the skull, i.e. skull deformities, of humans, especially of infants.

In another aspect of the invention, the shaped body according to the invention and/or the combination according to the invention serve to support the skull. This may be useful, for example, for people requiring nursing care or for stabilizing the position of a patient's head during artificial ventilation. The supporting action can also serve to relieve stress on the head and/or to permit a more comfortable lying position and is therefore also useful in the non-medical sector.

The invention further comprises the use of the shaped body according to the invention and/or the use of the combination according to the invention for supporting a skull, in particular for the prevention and/or for the treatment of positional deformations of the skull, in particular of the skull of infants.

In a further aspect, the invention comprises a method for supporting a skull. To this end, the skull is supported on a shaped body according to the invention and/or a combination according to the invention. The skull can be supported by bringing the skull into a defined position. The head can be brought here into a resting or partially resting position in which, for example, only the back of the head is brought into a defined resting position. In this aspect, the neck can then lie substantially flat with respect to the support plane. This method may be useful, for example, for people requiring nursing care or for stabilizing the position of a patient's head during artificial ventilation. This method can also serve to relieve stress on the head and/or to permit a more comfortable lying position and is therefore also useful in the non-medical sector. For example, pressure points on the head and/or tenseness in the head/neck region can be reduced or entirely avoided.

In another aspect, the invention comprises a method for the prevention or treatment of positional deformations of the skull of humans, in particular of infants. In this method, the skull is supported on a shaped body according to the invention and/or a combination according to the invention. The skull can be supported by bringing the skull into a defined position. The head can be brought here into a resting or partially resting position in which, for example, only the back of the head is brought into a defined resting position. This method can be used, for example, to treat skull deformations which develop on account of prolonged and confined positioning in the womb or on account of positionally difficult labour or which occur after birth as a result of the positioning of the head. The method can also be used to treat skull deformations that have different causes related to positioning. The method can also be used to prevent those skull deformations that may be caused by lying in the same position for long periods of time. The method can be used, for example, in people with reduced mobility, in particular infants, or also people requiring nursing care, or people who need the head to be supported in a defined position or who need the position of the head to be controlled externally.

The invention is explained below on the basis of illustrative embodiments.

Figure 1:
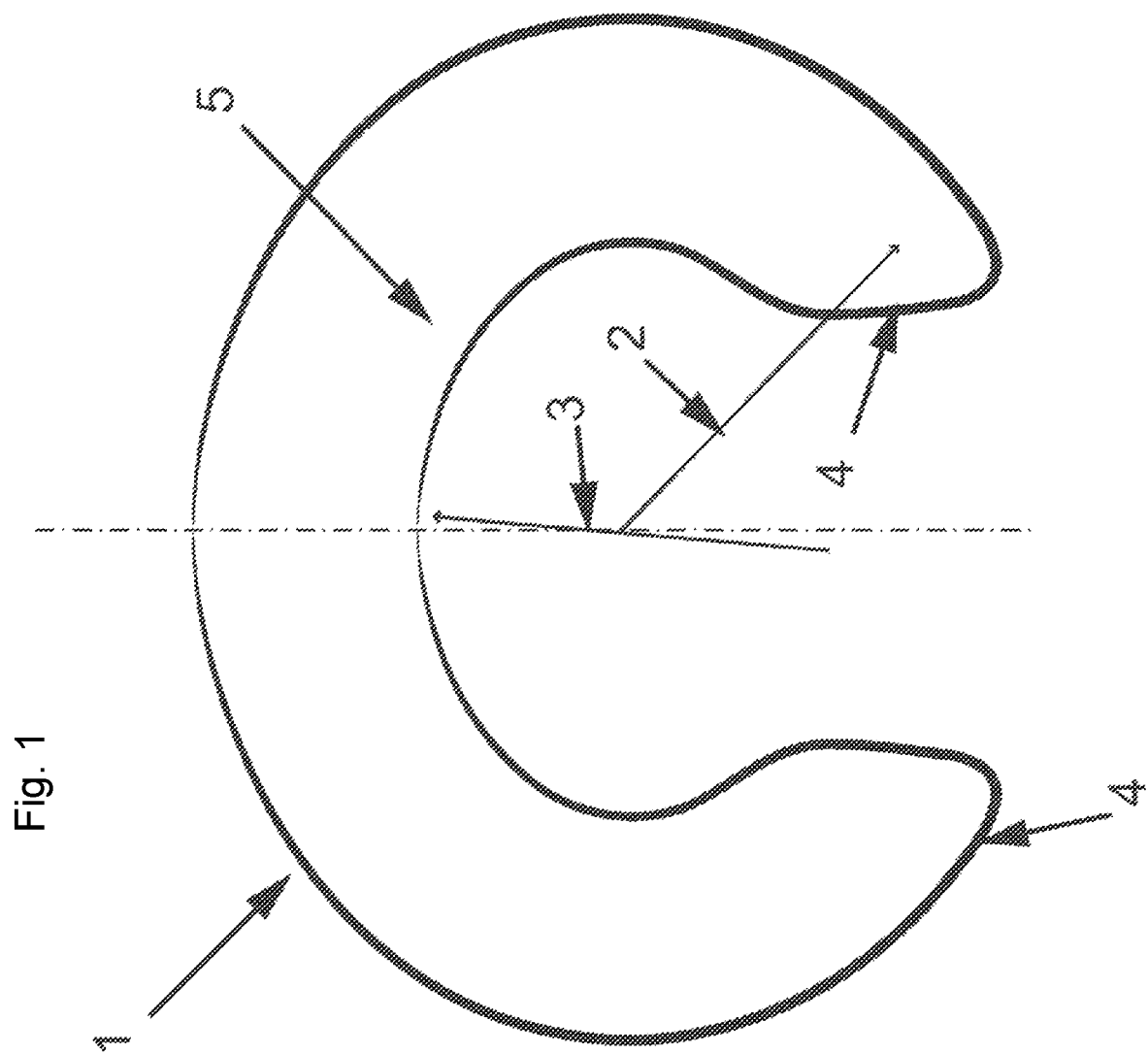
FIG. 1 shows a schematic plan view of a preferred embodiment of the shaped body according to the invention.

FIG. 1 shows a preferred embodiment of the shaped body (1) according to the invention in the form of an open ring in a plan view. The ring has a ring radius (2) and a ring axis (3) or Z axis. The ring radius (2) can vary. The shaped body (1) has the form of an open oval. The ring moreover has a mirror axis which extends perpendicularly to a support plane and centrally through an opening of the ring, which is formed by two ends (4). The ends (4) of the shaped body (1) are rounded and are flattened to form a support plane. The shaped body (1) has a support surface (5) for receiving a head which, depending on the ring radius (2), can in particular be the head of an infant.

Figure 2:
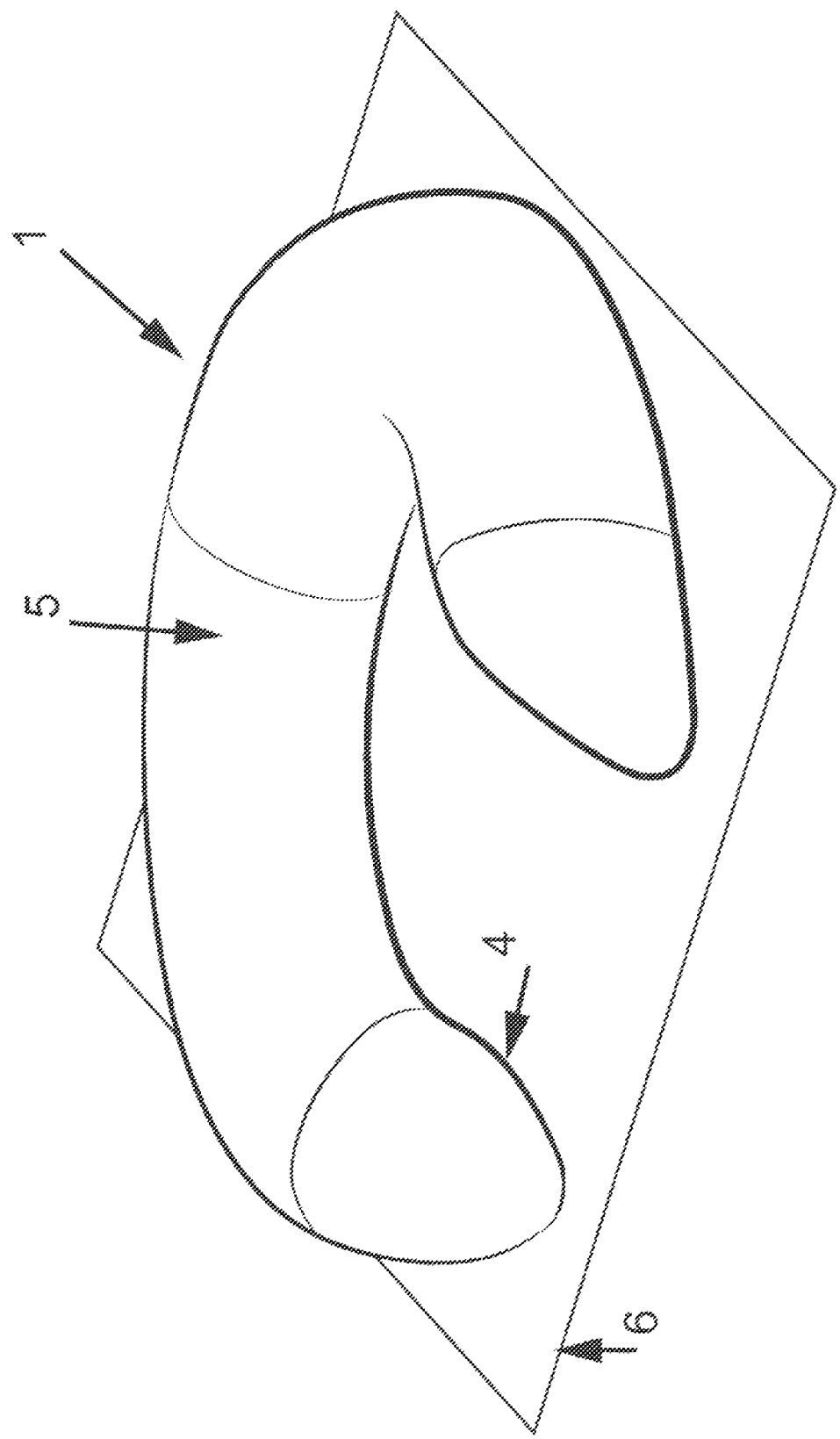
FIG. 2 shows a perspective side view of a preferred embodiment of the shaped body according to the invention.

FIG. 2 likewise shows a preferred embodiment of the shaped body (1) according to the invention in a three-dimensional perspective view. The shaped body (1) is located on a support plane (6).

Figure 3:
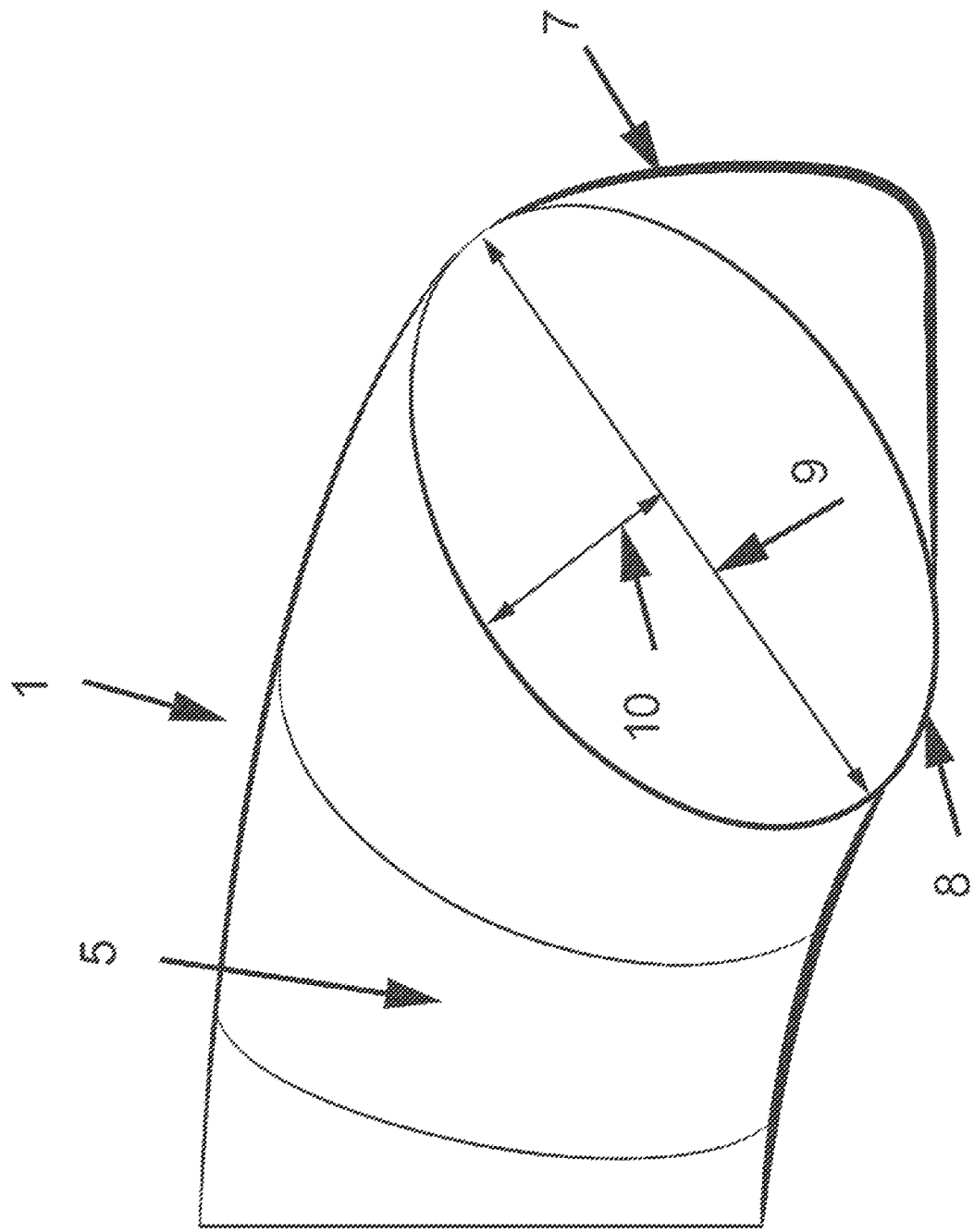
FIG. 3 shows a perspective side view with a cross section of a preferred embodiment of the shaped body according to the invention.

FIG. 3 shows a perspective side view of a part of the shaped body (1) with a cross section (7) in a likewise preferred embodiment. An ellipse (8) is drawn within the cross section (7) of the ring. The ellipse (8) is substantially superposed with an exact fit, in particular with respect to an upper half of the ellipse (8), which substantially covers the contour or the edge of the cross section (7). The ellipse (8) has a semi-major axis (9) and a semi-minor axis (10).

Figure 4:
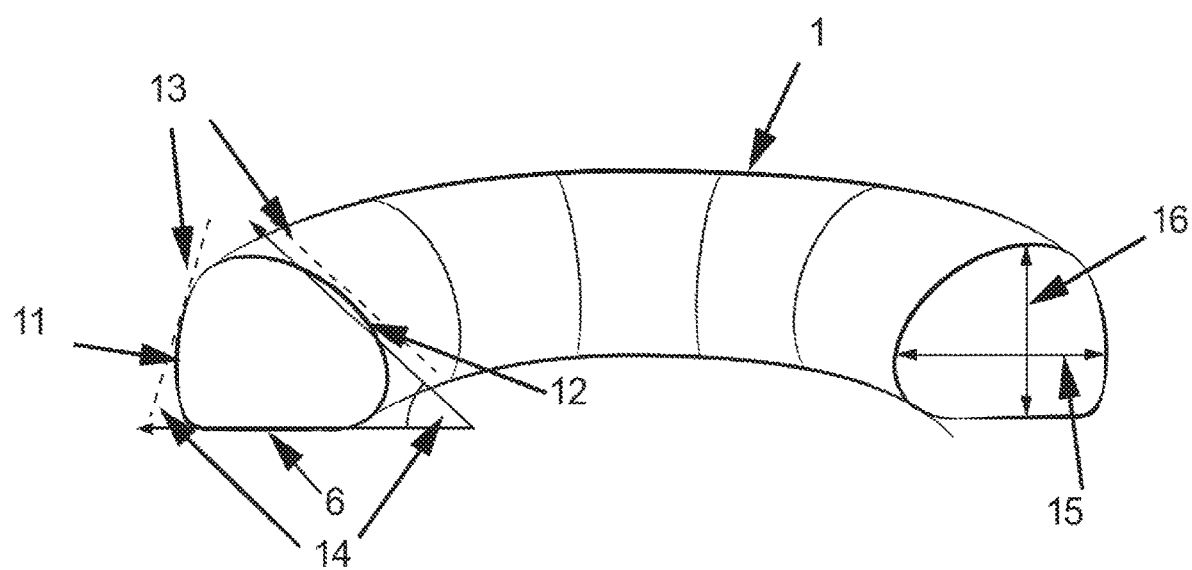
FIG. 4 shows a perspective side view with two cross sections and drawn-in gradients and/or tangents on an outwardly and an inwardly facing surface in a preferred embodiment of the shaped body according to the invention.

FIG. 4 shows a perspective side view with two cross sections (7) and drawn-in tangents (13) on an outwardly facing part (11) and an inwardly facing part (12) of the cross section (7) in a likewise preferred embodiment of the shaped body (1) according to the invention. Furthermore, the included angle (14) between a support plane (6) and an averaged tangent (13) on an inwardly facing part (12) of the cross section is drawn in. Also indicated in FIG. 4 are the horizontal, in this case maximum, diameter (15) and the vertical (maximum) diameter of a cross section (7) through the shaped body (1).

Figure 5:
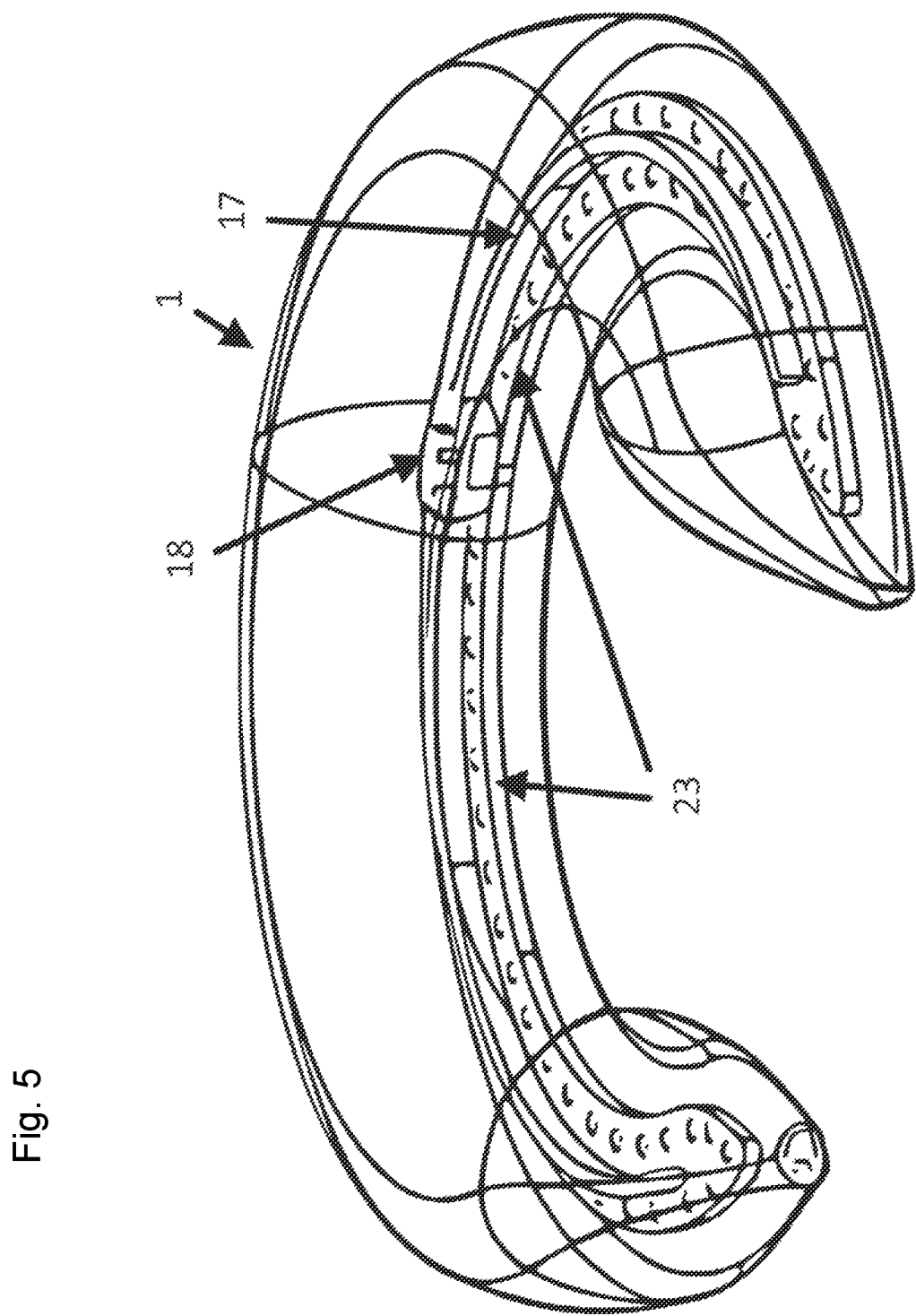
FIG. 5 shows a perspective side view of a preferred embodiment of the shaped body according to the invention with a preferred embodiment of a stiffening element.

FIG. 5 shows a perspective side view of a preferred embodiment of the shaped body (1) according to the invention with a cast-in or inserted stiffening element (17). The stiffening element (17) has two members (23), which can be connected by hinges (18) or other joints or joint-like connections. The stiffening element (17) is produced from a plastic or a metal, for example.

Figure 6:
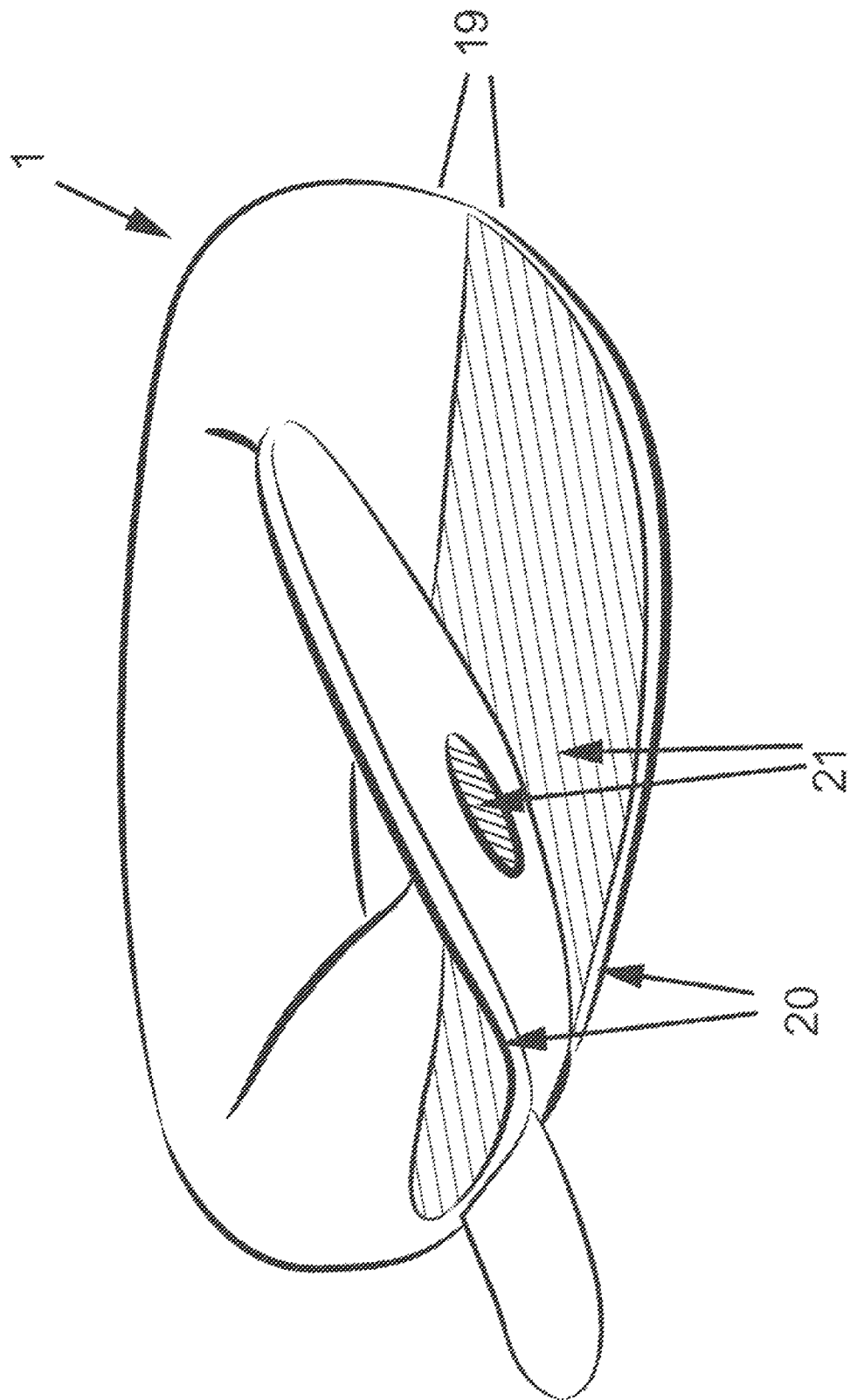
FIG. 6 shows a perspective side view of a preferred embodiment of the shaped body according to the invention with a cover according to the invention and with a Velcro fastener.

FIG. 6 shows a perspective side view of a preferred embodiment of the shaped body (1) according to the invention, with a cover (19) according to the invention for the shaped body (1), which cover (19) at least partially surrounds the shaped body (1), and with a Velcro fastener (21). The cover (19) has two ends (20) to which a Velcro fastener (21) is attached. Both ends (20) have a flat region. The Velcro fastener is composed of a Velcro pad and a Velcro material on the opposite side.

Figure 7:
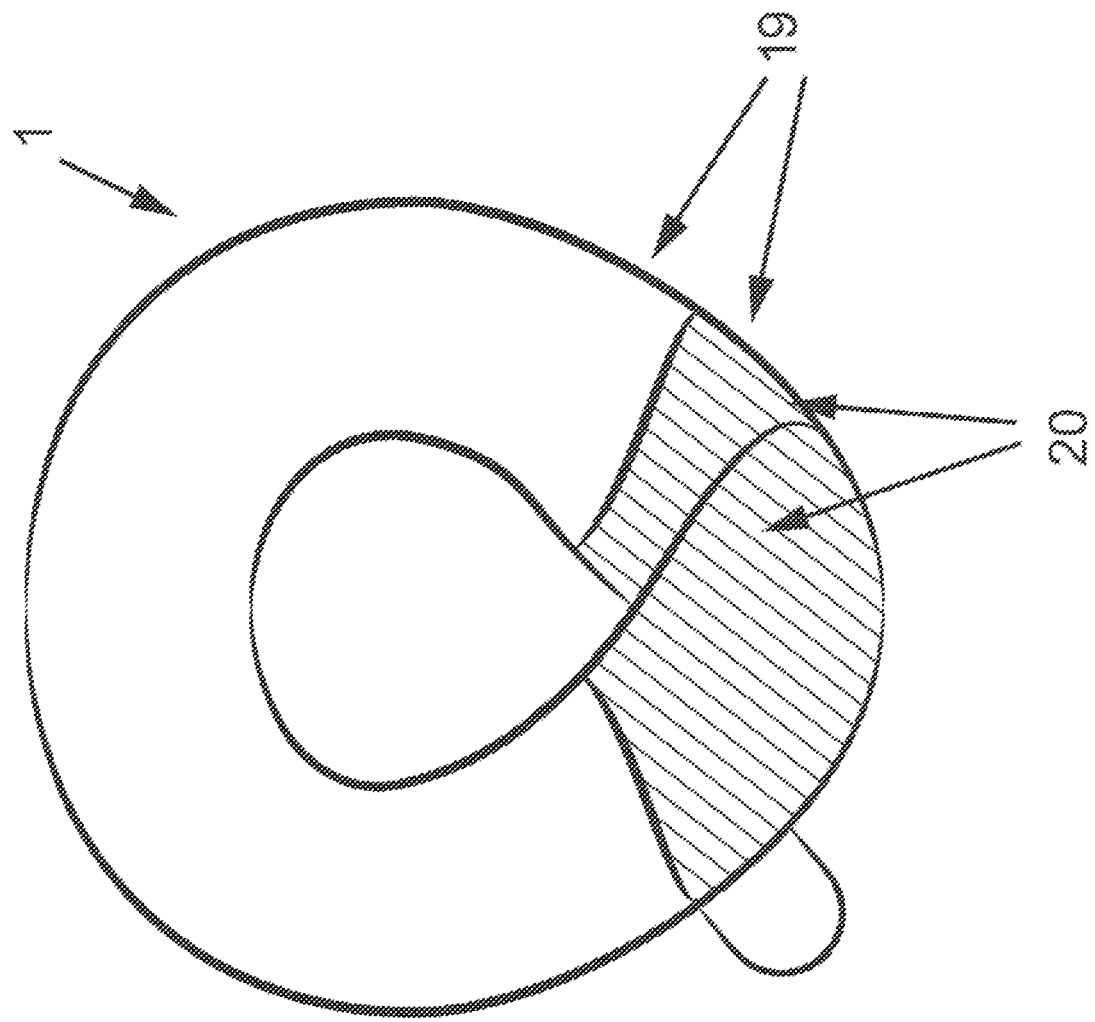
FIG. 7 shows a plan view of a preferred embodiment of the shaped body according to the invention with a cover according to the invention.

FIG. 7 shows a plan view of a preferred embodiment of the shaped body (1) according to the invention with a cover (19) according to the invention. The ends (20) lie on each other, and the ring is thus closed.

Figure 8:
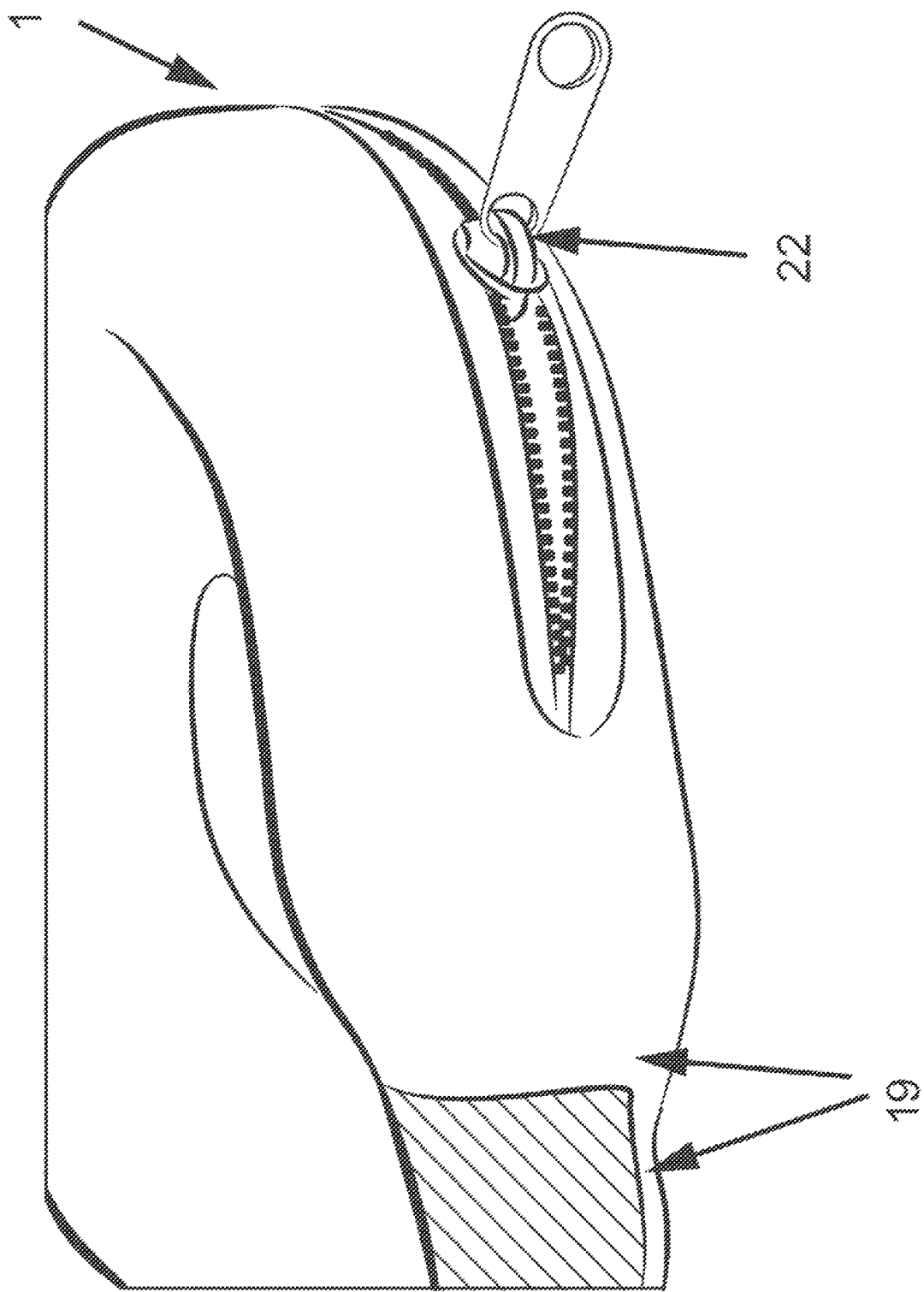
FIG. 8 shows a perspective side view of a preferred embodiment of the shaped body according to the invention with a cover according to the invention and with a partially recessible zipper.

FIG. 8 shows a perspective side view of a preferred embodiment of the shaped body (1) according to the invention with a cover (19) according to the invention and with a partially recessible zipper (22). The zipper (22) can be at least partially accommodated or inserted in a small pocket of the cover (19).

EMBODIMENTS

1. Shaped body (1) for receiving a skull on a support plane (6), said shaped body (1) being substantially ring-shaped and preferably open, characterized in that
   a. at least in one subregion, the contour of the cross section (7) of the shaped body (1) has a half ellipse (8) inclined with respect to the support plane (6), and
   b. at least in one subregion, the contour of the cross section (7) of the shaped body (1) is asymmetrical and has a convex support surface (5).
2. Shaped body according to embodiment 1, characterized in that, at least in one subregion, the included angle (14) between the support plane (6) and an averaged tangent (13) on an outwardly facing part (11) of the cross section of the shaped body (1) is greater than the included angle (14) between the support plane (6) and an averaged tangent (13) on an inwardly facing part (12) of the cross section of the shaped body (1).
3. Shaped body according to embodiment 2, characterized in that the semi-major axis (9) of the half ellipse (8) is inclined with respect to the support plane (6) by up to 90°, preferably by 25° to 50°, and/or the included angle (14) on the outwardly facing part (11) of the cross section is less than or equal to 180°, preferably 65° to 90°, more preferably 70° to 80°, and/or the included angle (14) on the inwardly facing part (12) of the cross section is less than or equal to 60°, preferably less than or equal to 50°, preferably 30° to 42°, more preferably 35° to 40°.
4. Shaped body according to one of the preceding embodiments, characterized in that the shaped body (1) has at least in part an indentation hardness of 8 N to 11 N, preferably of 9.5 N, and/or at least in part an indentation depth of 25% to 55%, preferably of 40%.
5. Shaped body according to one of the preceding embodiments, characterized in that the shaped body (1) comprises a material selected from a synthetic polymer, for example silicone, polyamides, polyesters, acrylates or polyurethanes (PUR/PU), for example a polyurethane foam, a natural polymer, for example rubber, cork or celluloses, and a semi-synthetic polymer, for example cellulose derivatives, or mixtures thereof, preferably from a silicone and/or polyurethane foam.

6. Shaped body according to embodiment 5, characterized in that the polyurethane foam has
    a closed surface and/or
    a bulk density of the foam of 40 to 1200 kg/m³, preferably of 150 to 1200 kg/m³, particularly preferably of 150 to 300 kg/m³, more preferably of 230 kg/m³, according to DIN EN ISO 845, and/or
    a density of the skin of 500 to 900 kg/m³, preferably of 600 to 800 kg/m³, particularly preferably of 700 kg/m³, according to DIN 53 479, and/or
    a tensile strength of the skin of 600 to 800 KPa, preferably of 724 KPa, according to DIN 53 504, and/or a tensile strength of the foam of 150 to 250 KPa, preferably of 206 KPa, according to DIN EN ISO 1798, and/or
    an elongation of the skin of 150 to 250%, preferably of 195%, according to DIN 52 504, and/or an elongation of the foam of 110 to 180%, preferably of 139%, according to DIN EN ISO 1798, and/or
    a tear propagation resistance of the skin of 2 to 4 N/mm, preferably of 3.1 N/mm, and/or a tear propagation resistance of the foam of 0.5 to 1.5 N/mm, preferably of 0.9 N/mm according to DIN ISO 34-1.
7. Shaped body according to embodiment 5, characterized in that the silicone has
    a Shore hardness on the silicone of approximately 45 Shore 00 to approximately 90 Shore A, preferably of approximately 55 Shore 00 to approximately 50 Shore A, very particularly preferably of approximately 70 Shore 00, according to DIN 53505, and/or
    a tear strength of the silicone of approximately 1 to approximately 8 N/mm², preferably of approximately 2 to approximately 6 N/mm², very particularly preferably of approximately 2 N/mm² according to DIN 53504 (specimen S3A), and/or
    an elongation of the silicone of approximately 400 to approximately 900%, preferably of approximately 500 to approximately 700%, very particularly preferably of approximately 600% according to DIN 53504 (specimen S3A), and/or
    a tear propagation resistance of the silicone of approximately 1.2 to approximately 16.5 N/mm, preferably of approximately 3 to approximately 12 N/mm, very particularly preferably of approximately 5 N/mm according to DIN 53515, and/or
    is powdered with talcum or fluorinated, preferably fluorinated.
8. Shaped body according to one of embodiments 5 to 7, characterized in that a UV protection additive and/or an antibacterial agent is contained in the polyurethane foam and/or in the silicone.
9. Shaped body according to one of embodiments 5 to 6 or 8, characterized in that the polyurethane foam is biodegradable.
10. Shaped body according to one of embodiments 5 to 6 or 8 to 9, characterized in that the shaped body (1) is produced from polyurethane foam particles and/or polyurethane foam flakes.
11. Shaped body according to one of the preceding embodiments, characterized in that the skull is the skull of an infant.
12. Shaped body according to one of the preceding embodiments, characterized in that the shaped body (1) comprises a flattened support surface (5).
13. Shaped body according to one of the preceding embodiments, characterized in that the shaped body (1) has a solid body and/or a hollow body, preferably a solid body.
14. Shaped body according to one of the preceding embodiments, characterized in that the shaped body (1) is open and has a first end (4) and a second end (4).
15. Shaped body according to one of the preceding embodiments, characterized in that an average diameter of a cross section (7) of the shaped body (1) decreases towards the ends.
16. Shaped body according to either of embodiments 14 and 15, characterized in that the ends (4) of the shaped body (1) each have mutually detachable means for connecting the ends (4).
17. Shaped body according to one of the preceding embodiments, characterized in that the shaped body (1) comprises a cover (19).
18. Shaped body according to embodiment 17, characterized in that the cover (19) surrounds the shaped body (1) completely or partially, preferably completely.
19. Shaped body according to either of embodiments 17 and 18, characterized in that the cover (19) lies on the shaped body (1), partially surrounds it and is embossed.
20. Shaped body according to one of embodiments 17 to 19, characterized in that the cover (19) is not an exact fit.
21. Shaped body according to one of embodiments 17 to 20, characterized in that the cover (19) has a first end (20) and a second end (20), and the ends (20) of the cover (19) each have mutually detachable means for connecting the ends (20).
22. Shaped body according to either of embodiments 16 and 21, characterized in that the detachable means are selected from the group comprising a Velcro closure, a button and buttonhole, a press stud and press stud receiver, a hook and eyelet, a cord, preferably a Velcro closure including a Velcro strips or Velcro pad, more preferably a Velcro pad.
23. Shaped body according to one of the preceding embodiments, characterized in that the shaped body (1) comprises a stiffening element (17).
24. Shaped body according to embodiment 23, characterized in that the stiffening element (17) is composed of two members (23).
25. Shaped body according to one of the preceding embodiments, characterized in that the shaped body (1) or the cover (19) has a first fastening means for fastening the shaped body (1) or the cover (19) to a base surface.
26. Combination comprising
    a. the shaped body (1) according to embodiment 25,
    b. a second fastening means for fastening the shaped body (1) according to a., wherein the first and second fastening means are connectable.
27. Combination according to embodiment 26, wherein the second fastening means is fastened to a base surface or to a cover of the base surface.
28. Shaped body according to one of embodiments 1 to 25 and/or the combination according to embodiment 26 or 27 for supporting the skull.
29. Shaped body according to one of embodiments 1 to 25 and/or the combination according to embodiment 26 or 27 for the prevention and/or for the treatment of positional deformations of the skull, in particular the skull of infants.
30. Use of the shaped body according to one of embodiments 1 to 25 and/or of the combination according to embodiment 26 or 27 for supporting the skull.
31. Use according to embodiment 30 for the prevention and/or for the treatment of positional deformations of the skull, in particular the skull of infants.

PARTICULARLY PREFERRED EMBODIMENTS

1. Shaped body (1) for receiving a skull on a support plane (6), said shaped body (1) being substantially ring-shaped and preferably open, characterized in that
   a. at least in one subregion, the contour of the cross section (7) of the shaped body (1) has a half ellipse (8) inclined with respect to the support plane (6), and/or
   b. at least in one subregion, the contour of the cross section (7) of the shaped body (1) is asymmetrical and has a convex support surface (5).
2. Shaped body according to embodiment 1, characterized in that the shaped body (1) comprises a material selected from a synthetic polymer, for example silicone, polyamides, polyesters, acrylates or polyurethanes (PUR/PU), for example a polyurethane foam, a natural polymer, for example rubber, cork or celluloses, and a semi-synthetic polymer, for example cellulose derivatives, or mixtures thereof, preferably from a silicone and/or polyurethane foam.
3. Shaped body according to embodiment 1 or 2, characterized in that the shaped body (1) is open and has a first end (4) and a second end (4).
4. Shaped body according to one of the preceding embodiments, characterized in that the shaped body (1) comprises a cover (19).
5. Shaped body according to embodiment 4, characterized in that the cover (19) has a first end (20) and a second end (20), and the ends (20) of the cover (19) each have mutually detachable means for connecting the ends (20).
6. Shaped body according to embodiment 5, characterized in that the detachable means are selected from the group comprising a Velcro closure, a button and buttonhole, a press stud and press stud receiver, a hook and eyelet, a cord, preferably a Velcro closure including a Velcro strip or Velcro pad, more preferably a Velcro pad.
7. Shaped body according to one of the preceding embodiments, characterized in that the shaped body (1) comprises a stiffening element (17).
8. Shaped body according to embodiment 7, characterized in that the stiffening element (17) is composed of two members (23).
9. Shaped body according to one of the preceding embodiments, characterized in that the shaped body (1) or the cover (19) has a first fastening means for fastening the shaped body (1) or the cover (19) to a base surface.
10. Combination comprising
    a. the shaped body (1) according to embodiment 9,
    b. a second fastening means for fastening the shaped body (1) according to a., wherein the first and second fastening means are connectable.
11. Combination according to embodiment 10, wherein the second fastening means is fastened to a base surface or to a cover of the base surface.
12. Shaped body according to one of embodiments 1 to 9 and/or the combination according to embodiment 10 or 11 for supporting the skull.
13. Shaped body according to one of embodiments 1 to 9 and/or the combination according to embodiment 10 or 11 for the prevention and/or for the treatment of positional deformations of the skull, in particular the skull of infants.
14. Use of the shaped body according to one of embodiments 1 to 9 or of the combination according to embodiment 10 or 11 for supporting the skull.
15. Use according to embodiment 14 for the prevention and/or for the treatment of positional deformations of the skull, in particular the skull of infants.

LIST OF REFERENCE SIGNS 1 shaped body
2 ring radius
3 ring axis (Z axis)
4 end of the shaped body
5 support surface
6 support plane
7 cross section
8 ellipse
9 semi-major axis
10 semi-minor axis
11 outwardly facing part of the cross section
12 inwardly facing part of the cross section
13 tangent
14 included angle between the support plane and an averaged tangent
15 horizontal diameter
16 vertical diameter
17 stiffening element
18 joint/hinge
19 cover of the shaped body
20 end of the cover
21 Velcro fastener
22 zipper
23 member

The invention claimed is:
1. A shaped body (1) for receiving a skull on a support plane (6), said shaped body (1) being ring-shaped and open, characterized in that:
   a. at least in one subregion, a contour of a cross section (7) of the shaped body (1) has a half ellipse (8) inclined with respect to the support plane (6), and
   b. the contour of the cross section (7) of the shaped body (1) is asymmetrical, and at least in the one subregion, the contour of the cross section (7) of the shaped body (1) has a convex support surface with an inwardly facing part, the inwardly facing part having a substantially flat inclination configured to distribute pressure forces acting on the skull while allowing freedom of movement and wherein at least in the one subregion, an included angle (14) between the support plane (6) and an averaged tangent (13) on an outwardly facing part (11) of the cross section of the shaped body (1) is greater than an included angle (14) between the support plane (6) and an averaged tangent (13) on the inwardly facing part (12) of the cross section of the shaped body (1) and wherein a semi-major axis (9) of the half ellipse (8) is inclined with respect to the support plane (6), on which the shaped body lies substantially flat, by 25° to 50°, and the included angle (14) on the outwardly facing part (11) of the cross section is 65° to 90° and the included angle (14) on the inwardly facing part (12) of the cross section is less than or equal to 50°.

2. The shaped body according to claim 1, characterized in that the semi-major axis (9) of the half ellipse (8) is inclined with respect to the support plane (6) by 25° to 50°, and the included angle (14) on the outwardly facing part (11) of the cross section is 70° to 80°, and the included angle (14) on the inwardly facing part (12) of the cross section is 30° to 42°, more preferably 35° to 40°.

3. The shaped body according to claim 1, characterized in that the shaped body (1) has at least in part an indentation hardness of 8 N to 11 N, preferably of 9.5 N, and/or at least in part an indentation depth of 25% to 55%, preferably of 40%.

4. The shaped body according to claim 1, characterized in that the foam body comprises polyurethane foam including a skin which has
- a closed surface and/or
- a bulk density of the foam of 40 to 1200 kg/m3, preferably of 150 to 1200 kg/m3, particularly preferably of 150 to 300 kg/m3, more preferably of 230 kg/m3, according to DIN EN ISO 845, and/or
- a density of the skin of 500 to 900 kg/m3, preferably of 600 to 800 kg/m3, particularly preferably of 700 kg/m3, according to DIN 53 479, and/or
- a tensile strength of the skin of 600 to 800 KPa, preferably of 724 KPa, according to DIN 53 504, and/or a tensile strength of the foam of 150 to 250 KPa, preferably of 206 KPa, according to DIN EN ISO 1798, and/or—an elongation of the skin of 150 to 250%, preferably of 195%, according to DIN 52 504, and/or an elongation of the foam of] 10 to 180%, preferably of 139%, according to DIN EN ISO 1798, and/or—a tear propagation resistance of the skin of 2 to 4 N/mm, preferably of 3.1 N/mm, and/or a tear propagation resistance of the foam of 0.5 to 1.5 N/mm, preferably of 0.9 N/mm according to DIN ISO 34-1.

5. The shaped body according to claim 1, characterized in that the foam body comprises silicone, and the silicone has
- a Shore hardness on the silicone of approximately 45 Shore 00 to approximately 90 Shore A, preferably of approximately 55 Shore 00 to approximately 50 Shore A, very particularly preferably of approximately 70 Shore 00, according to DIN 53505, and/or
- a tear strength of the silicone of approximately 1 to approximately 8 N/mm$^2$, preferably of approximately 2 to approximately 6 N/mm$^2$, very particularly preferably of approximately 2 N/mm$^2$ according to DIN 53504 (specimen S3A), and/or
- an elongation of the silicone of approximately 400 to approximately 900%, preferably of approximately 500 to approximately 700%, very particularly preferably of approximately 600% according to DIN 53504 (specimen S3A), and/or
- a tear propagation resistance of the silicone of approximately 1.2 to approximately 16.5 N/mm, preferably of approximately 3 to approximately 12 N/mm, very particularly preferably of approximately 5 N/mm according to DIN 53515, and/or
- is powdered with talcum or fluorinated, preferably fluorinated.

6. The shaped body according to claim 1, characterized in that the shaped body contains a UV protection additive and/or an antibacterial agent.

7. The shaped body according to claim 1, characterized in that the skull is the skull of an infant.

8. The shaped body according to claim 1, characterized in that the shaped body (1) has a solid body and/or a hollow body, preferably a solid body.

9. The shaped body according to claim 1, characterized in that the shaped body (1) is open and has a first end (4) and a second end (4).

10. The shaped body according to claim 1, characterized in that the shaped body comprises a cover (19) and that the cover (19) is not an exact fit.

11. The shaped body according to claim 1, characterized in that the shaped body (1) comprises a stiffening element (17).

12. The shaped body according to claim 1, characterized in that the shaped body (1) comprises a stiffening element (17), which is composed of two members (23).

13. A combination comprising
  a. the shaped body (1) according to claim 1, which comprises a first fastening means,
  b. a second fastening means for fastening the shaped body (1) wherein the first and second fastening means are connectable.

14. A method for the prevention and/or for the treatment of positional deformations of the skull, in particular the skull of infants, characterized in that the skull is supported on the combination according to claim 13.

15. A method for the prevention and/or for the treatment of positional deformations of the skull, in particular the skull of infants, characterized in that the skull is supported on a shaped body according to claim 1.

* * * * *